(12) United States Patent
MacNeille et al.

(10) Patent No.: US 10,181,264 B2
(45) Date of Patent: Jan. 15, 2019

(54) SYSTEMS AND METHODS FOR INTERSECTION ASSISTANCE USING DEDICATED SHORT RANGE COMMUNICATIONS

(71) Applicant: Ford Global Technologies, LLC, Dearborn, MI (US)

(72) Inventors: Perry Robinson MacNeille, Lathrup Village, MI (US); Brian Bennie, Sterling Heights, MI (US); Allen R. Murray, Lake Orion, MI (US); Cynthia M. Neubecker, Westland, MI (US); Omar Makke, Lyon Township, MI (US); Noorulla Mohammed, Farmington Hills, MI (US); Oliver Lei, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 15/131,787

(22) Filed: Apr. 18, 2016

(65) Prior Publication Data

US 2017/0301237 A1 Oct. 19, 2017

(51) Int. Cl.
*G08G 1/16* (2006.01)
*H04W 4/70* (2018.01)
(Continued)

(52) U.S. Cl.
CPC ............ *G08G 1/161* (2013.01); *G08G 1/087* (2013.01); *G08G 1/0962* (2013.01);
(Continued)

(58) Field of Classification Search
CPC ............................ G08G 1/161; G08G 1/0962
See application file for complete search history.

(56) References Cited

U.S. PATENT DOCUMENTS

| 5,926,113 A | 7/1999 | Jones et al. |
|---|---|---|
| 7,133,767 B2 | 11/2006 | Ogino et al. |

(Continued)

FOREIGN PATENT DOCUMENTS

| CN | 103359013 A | 10/2013 |
|---|---|---|
| JP | 2002229646 A | 8/2002 |

(Continued)

OTHER PUBLICATIONS

Guarav Bansal et al, *Controlling Congestion in Safety-Message Transmissions—A Philosophy for Vehicular DSRC Systems*, Dec. 2013, (2 Pages).

(Continued)

*Primary Examiner* — Jess Whittington
(74) *Attorney, Agent, or Firm* — James P. Muraff; Neal, Gerber & Eisenberg LLP

(57) ABSTRACT

Systems and methods for intersection assistance using dedicated short range communications are disclosed. An example vehicle includes a dedicated short range communication transceiver and an intersection assistor. The example dedicated short range communication transceiver is configured to receive safety messages from other vehicles. The example intersection assistor is configured to, before the vehicle reaches an intersection, determine a likelihood that there will be space for the vehicle on the other side of the intersection, and display a recommendation on whether to proceed through the intersection based on the likelihood.

15 Claims, 6 Drawing Sheets

(51) Int. Cl.
*H04W 4/80* (2018.01)
*G08G 1/0962* (2006.01)
*H04L 29/08* (2006.01)
*H04W 4/04* (2009.01)
*H04W 68/00* (2009.01)
*G08G 1/087* (2006.01)
*G08G 1/0967* (2006.01)
*H04W 84/18* (2009.01)

(52) U.S. Cl.
CPC ... *G08G 1/09675* (2013.01); *G08G 1/096716* (2013.01); *G08G 1/096741* (2013.01); *G08G 1/096783* (2013.01); *G08G 1/096791* (2013.01); *H04L 67/12* (2013.01); *H04W 4/046* (2013.01); *H04W 4/70* (2018.02); *H04W 4/80* (2018.02); *H04W 68/005* (2013.01); *H04W 84/18* (2013.01)

(56) References Cited

U.S. PATENT DOCUMENTS

| | | | |
|---|---|---|---|
| 9,020,660 B2 | 4/2015 | Mudalige et al. | |
| 9,031,776 B2 | 5/2015 | Goudy et al. | |
| 2008/0162027 A1* | 7/2008 | Murphy | B60W 50/14 701/117 |
| 2009/0082949 A1* | 3/2009 | Petrie | B60T 7/22 701/119 |
| 2012/0146811 A1* | 6/2012 | Chou | G08G 1/096783 340/905 |
| 2013/0304364 A1* | 11/2013 | Miller | G08G 1/09626 701/117 |
| 2013/0304365 A1* | 11/2013 | Trombley | G08G 1/09626 701/117 |
| 2014/0149031 A1 | 5/2014 | Goudy et al. | |
| 2015/0084758 A1* | 3/2015 | Mitts | B60Q 5/006 340/438 |
| 2015/0160653 A1* | 6/2015 | Cheatham, III | G05D 1/0088 701/23 |
| 2015/0243170 A1* | 8/2015 | Collar | G08G 1/017 340/933 |
| 2015/0310738 A1* | 10/2015 | Karacan | G08G 1/0112 701/117 |
| 2016/0161270 A1* | 6/2016 | Okumura | G01C 21/34 701/23 |
| 2016/0280132 A1* | 9/2016 | Palanimuthu | B60Q 9/008 |
| 2017/0001636 A1* | 1/2017 | Laur | B60W 30/09 |
| 2017/0032402 A1* | 2/2017 | Patsiokas | G06Q 30/0266 |
| 2017/0113665 A1* | 4/2017 | Mudalige | G08G 1/166 |
| 2017/0113683 A1* | 4/2017 | Mudalige | B60W 30/08 |
| 2017/0131719 A1* | 5/2017 | Micks | B60W 40/08 |
| 2017/0205825 A1* | 7/2017 | Wang | B60W 30/18154 |

FOREIGN PATENT DOCUMENTS

| | | |
|---|---|---|
| JP | 2005165643 A | 6/2005 |
| JP | 2008015670 A | 1/2008 |
| JP | 2009146288 A | 7/2009 |

OTHER PUBLICATIONS

Craig Jordan et al, *Path Clearance for Emergency Vehicles Through the Use of Vehicle-to-Vehicle Communication* (2 Pages).
Lockheed Martin, *Core System Requirements Specification (SyRS)*, U.S. Department of Transportation, Research and Innovative Technology Administration, Apr. 2011 (131 Pages).
Search Report dated May 15, 2017 for Great Britain Patent Application No. GB 1706094.8 (4 Pages).

* cited by examiner

SYSTEMS AND METHODS FOR INTERSECTION ASSISTANCE USING DEDICATED SHORT RANGE COMMUNICATIONS

TECHNICAL FIELD

The present disclosure generally relates to managing traffic at intersections and, more specifically, systems and methods for intersection assistance using dedicated short range communications.

BACKGROUND

Sometimes while crossing an intersection during congestion, drivers assume they can cross the intersection in time before the traffic light turns red, only to be stuck in the middle of the intersection when the vehicles on the other side of the intersection stop moving. This phenomenon is referred to as spillback. In many jurisdictions, entering an intersection when there is not sufficient space on the other side to clear the intersection is a ticketable offense. Additionally, vehicles stuck in intersections cause gridlock because cross traffic cannot proceed through the intersection. This in turn causes spillback in adjacent intersections.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments for intersection assistance using dedicated short range communications are disclosed. An example vehicle includes a dedicated short range communication transceiver and an intersection assistor. The example dedicated short range communication transceiver is configured to receive safety messages from other vehicles. The example intersection assistor is configured to, before the vehicle reaches an intersection, determine a likelihood that there will be space for the vehicle on the other side of the intersection, and display a recommendation on whether to proceed through the intersection based on the likelihood.

An example disclosed method includes a receiving, via a dedicated short range communication transceiver, safety messages from second vehicles within range of a first vehicle. The example method also includes, before the first vehicle reaches an intersection, determining, with a processor, a likelihood that there will be space for the first vehicle on the other side of the intersection, and displaying a recommendation on whether to proceed through the intersection based on the likelihood An example tangible computer readable medium comprising instructions that, when executes, cause a vehicle to receive, via a dedicated short range communication transceiver, safety messages from second vehicles within range of a first vehicle. The example instructions, when executed, also cause the vehicle to, before the first vehicle reaches an intersection, determine a likelihood that there will be space for the first vehicle on the other side of the intersection, and display a recommendation on whether to proceed through the intersection based on the likelihood.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
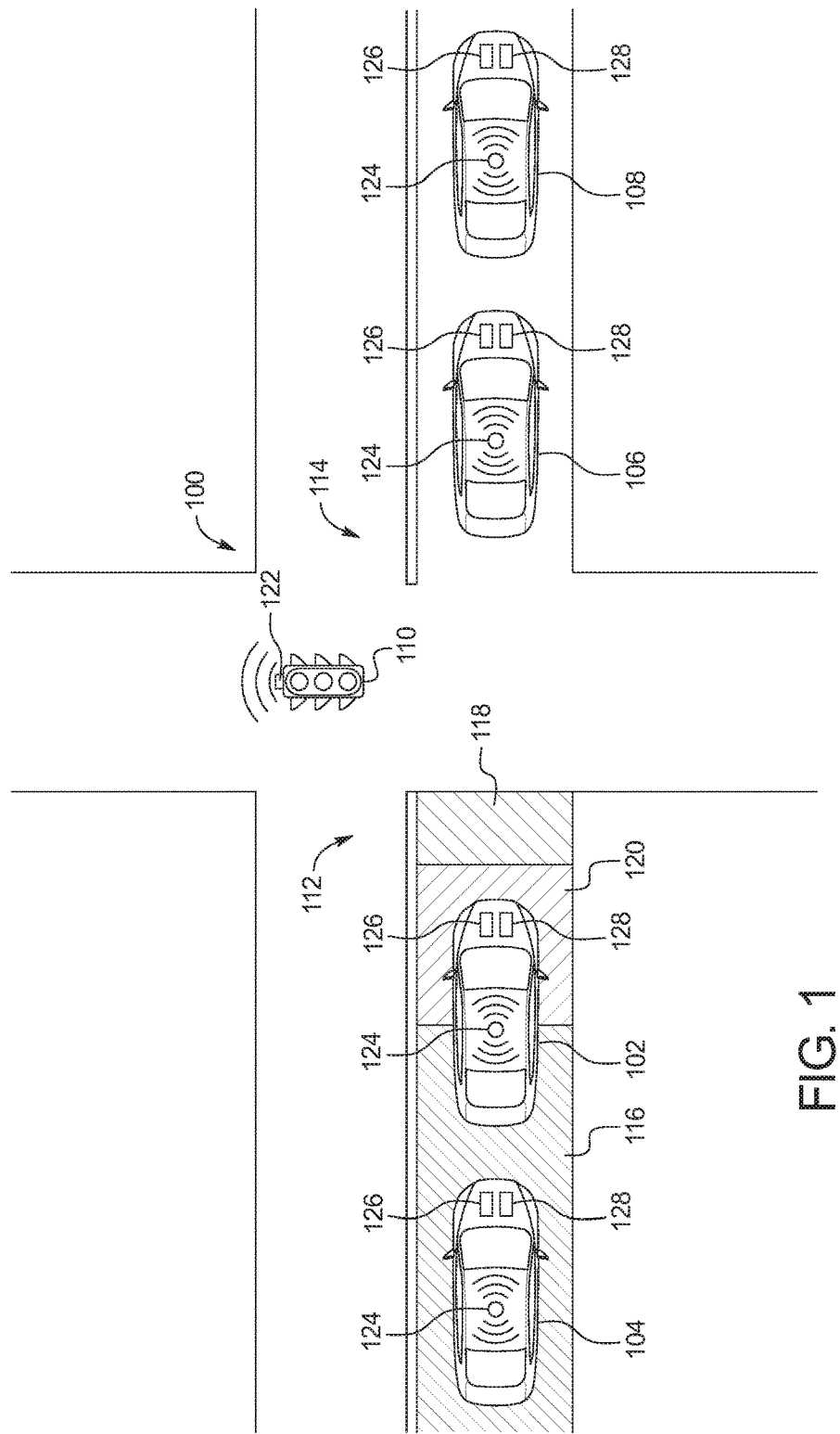
FIG. 1 illustrates an example intersection with vehicles and infrastructure facilitating intersection assistance using dedicated short range communications in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicle-to-vehicle (V2V) and vehicle-to-infrastructure (V2I) communication technology facilitate vehicles and nodes attached to infrastructure (e.g., traffic signals, tunnels, bridges, etc.) to exchange information. From time to time, vehicles broadcast safety messages that include information regarding the vehicle, such as the vehicle size (e.g., length, width, weight, etc.), the speed of the vehicle, the heading of the vehicle, and the location of the vehicle. Vehicles and infrastructure nodes receiving the safety broad casts make decisions about interacting with the vehicle broadcasting the message.

As discussed below, when a vehicle approaches an intersection, it receives broadcasts from other vehicles and an infrastructure node of the intersection traffic signal to determine whether the vehicle ahead is likely to proceed through to the other side of the intersection. The vehicle approaching the intersection determines the speeds and locations of other vehicles with the same heading on both sides of the intersection. The vehicle also determines road conditions to determine the vehicle's braking distance. Additionally, the vehicle determines, from safety broadcasts from the infrastructure node of the intersection traffic signal, how long until the traffic light turns yellow. With this information, the vehicle recommends either proceeding through the intersection or braking.

FIG. 1 illustrates an example intersection 100 with vehicles 102, 104, 106, and 108 (e.g., cars, trucks, semi-trucks, motorcycles, mopeds, etc.) and a traffic signal 110 facilitating intersection assistance using dedicated short range communications (DSRC) in accordance with the teachings of this disclosure. The intersection 100 has a near side 112 and a far side 114. The near side 112 is the side of the intersection 100 from which a crossing vehicle 102 is approaching the intersection 100. The far side 114 is the side of the intersection 100 opposite the near side 112.

In the illustrated example, the near side 112 is divided into a stop zone 116, a go zone 118, and a dilemma zone 120. The stop zone 116 is an area in which, if the crossing vehicle 102 is within the area when the traffic signal 110 changes from green to yellow, the crossing vehicle 102 should not proceed through intersection 100. For example, if the crossing vehicle 102 in the stop zone 116 were to proceed through the intersection 100, the crossing vehicle 102 would likely be in the intersection 100 when the traffic light changes from yellow to red. The go zone 118 is an area in which, if the crossing vehicle 102 is within the area when the traffic signal 110 changes from green to yellow, the crossing vehicle 102 should proceed through the intersection 100. For example, if the crossing vehicle 102 is in the go zone 118, the crossing vehicle 102 may not be able to safely stop before reaching the intersection.

The dilemma zone 120 is an area between the stop zone 116 and the go zone 118 in which, if the crossing vehicle 102 is within the area when the traffic signal 110 changes from green to yellow, the crossing vehicle 102 may (a) not be able to stop before the intersection 100 and (b) not be able to proceed through the intersection 100 before the traffic signal 110 changes from yellow to red. When the crossing vehicle 102 is in the dilemma zone 120, the driver of the crossing vehicle 102 makes a judgment call. However, areas of the stop zone 116, the go zone 118, and the dilemma zone 120 change based on the speed of the crossing vehicle 102, the road conditions, and the traffic.

In the illustrated example, the traffic signal 110 includes a dedicated short range communications (DSRC) transceiver 122. In some examples, the DSRC transceiver 122 is on the traffic signal 110. Alternatively, in some examples, the DSRC transceiver 122 is located on a traffic control box (not shown) that is directing the operation of the traffic signal 110. The traffic signal 110, via the DSRC transceiver 122 broadcasts a signal phase and timing (SPaT) message. The SPaT messages include the state of the signals in each direction and the timing of the signals in each direction. For example, the SPaT message of the traffic signal 110 may indicate that a pair of north-south signals are currently red and will be changing to green in 25 seconds, and a pair of east-west signals are currently green and will be changing to yellow in 20 seconds. In some examples, the traffic signal 110, via the DSRC transceiver 122 broadcasts a geometric intersection description (GID) message. The GID message contains the dimensions of the intersection 100. In some examples, the traffic signal 110 receives and reacts to messages from the vehicles 102, 104, 106 and 108. For example, one of the vehicles 102 may broadcast that it is entering the associated intersection 100 and its estimated travel time through the intersection 100. In such an example, if the traffic signal 110 determines that the vehicle 102 will be in the intersection 100 when the cross-traffic signal is scheduled to turn green, the traffic signal 110 may delay changing the cross-traffic signal until the vehicle has cleared the intersection 100.

The vehicles 102, 104, 106, and 108 may be a standard gasoline powered vehicle, a hybrid vehicle, an electric vehicle, a fuel cell vehicle, or any other type of suitable vehicle. The vehicles 102, 104, 106, and 108 may be non-autonomous, semi-autonomous, or autonomous. The vehicles 102, 104, 106, and 108 include parts related to mobility, such as a powertrain with an engine, a transmission, a suspension, a driveshaft, and/or wheels, etc. The vehicles 102, 104, 106, and 108 may also include standard features (not shown) such as a dashboard, adjustable seats, one or more batteries, an HVAC system including a compressor and electronic expansion valve, a windshield, doors, windows, seatbelts, airbags, and tires.

The vehicles 102, 104, 106, and 108 include a DSRC transceiver 124, a traction control unit 126, and an intersection assistor 128. The example DSRC transceiver 124 includes antenna(s), radio(s) and software to broadcast safety messages. The safety messages include the size (e.g., length, width, weight, etc.) of the broadcasting vehicle 102, 104, 106, and 108, the speed of the broadcasting vehicle 102, 104, 106, and 108, the heading of the broadcasting vehicle 102, 104, 106, and 108, and the location of the broadcasting vehicle 102, 104, 106, and 108. The DSRC transceiver 124 also receives the safety message of the vehicles 102, 104, 106, and 108 in range (e.g., within 300 meters).

The traction control unit 126 prevents a loss of traction of the wheels of the vehicle 102, 104, 106, and 108. The traction control unit 126 detects when the wheels of the vehicle 102, 104, 106, and 108 are changing speed at different rates. The traction control 126 unit puts out a signal when one of the wheels slip in response to torque from the power train, which is indicative of road conditions (e.g., wet, slippery, etc.) that affect the braking distance of the vehicle 102, 104, 106, and 108. In some examples, the signal produced by the traction control unit 126 has a value between 0 and 1 that indicates the amount of friction between the road and the tire.

The intersection assistor 128 provides a recommendation (e.g., via the infotainment head unit 304 of FIG. 3 below) on whether to proceed through the intersection 100 and/or provides an instruction (e.g., to an autonomous driving control) on whether to proceed through the intersection 100. The intersection assistor 128 bases the recommendation on (i) the location and speed of vehicles (e.g., the vehicles 106 and 108) on the far side 114 of the intersection 100, the braking distance of the vehicle (e.g. the vehicle 102), and (iii) the time until the traffic signal 110 changes from a green light to a yellow light. In some examples, the intersection assistor 128 also considers the acceleration and the range to the vehicles 106 and 108.

The intersection assistor 128 is communicatively coupled to the DSRC transceiver 124. The intersection assistor 128, from time to time (e.g., every second, every five seconds, etc.), analyzes the safety message received from the other vehicles 104, 106, and 108 to determine which vehicles 106 and 108 are on the far side 114 of the intersection 100 with the same heading as the crossing vehicle 102. The intersection assistor 128 analyzes the speed(s) of the vehicle(s) 106 and 108 with the same heading and the layout of traffic (e.g., gaps between the vehicles 106 and 108, etc.) on the far side 114 of the intersection 100. Additionally, the intersection assistor 128 receives the SPaT messages from the traffic signal 110. Based on the SPaT messages from the traffic signal 110, the intersection assistor 128 determines the status and timing of the traffic signal 110 corresponding to the heading of the vehicle 102.

The intersection assistor 128 determines the stopping distance of the vehicle 102. The stopping distance is based on the speed of the vehicle 102, the road condition, and the weight of the vehicle 102. To determine the speed and/or the road condition, the intersection assistor 128 is communicatively coupled to the traction control unit 126. Alternatively or additionally, in some examples, the intersection assistor 128 is communicatively coupled with wheel speed sensors of the vehicle 102 and/or an anti-lock brake module. The intersection assistor 128 uses the gross vehicle weight (GVW) of the vehicle 102. In some examples, the GVW of the vehicle 102 stored in memory (e.g., the memory 322 of FIG. 3 below). In some examples, the intersection assistor 128 may use data from other sensors installed on the vehicle 102 to determine the stopping distance of the vehicles, such as tire pressure monitor system sensors that report the inflation levels of the tires.

Based on (a) a distance to the intersection 100, (b) a travel time through the intersection 100, (c) the stopping distance of the vehicle 102, (d) the status and timing of the traffic signal 110 corresponding to the heading of the vehicle 102, and (e) the layout of traffic on the far side 114 of the intersection 100, the intersection assistor 128 determines a recommendation regarding whether to proceed through the intersection 100. The intersection assistor 128 recommends to stop before the intersection if (i) the traffic signal will change to red (e.g., from green to yellow and then from yellow to red, etc.) before the vehicle 102 is projected to travel through the intersection 100 and the vehicle 102 can stop before the intersection 100, or (ii) if is it projected that there will not be sufficient room on the far side 114 of the intersection 100 for the vehicle 102 and the vehicle 102 is able to stop before the intersection 100. The intersection assistor 128 recommends proceeding through the intersection if (i) the vehicle 102 is projected to travel through the intersection 100 before the traffic signal 110 will turn red and (ii) there is projected to be sufficient room on the far side 114 of the intersection 100 for the vehicle 102. In some examples, the intersection assistor 128 recommends proceeding through the intersection if (i) it is projected that there will be sufficient room on the far side 114 of the intersection 100 for the vehicle 102, (ii) the traffic signal will change to red before the vehicle 102 is projected to travel through the intersection 100, and (c) the vehicle 102 cannot stop before the intersection 100. In some such examples, the intersection assistor 128 sends a request, via the DSRC transceiver 124, to the traffic signal 110 to hold the cross-traffic light red until the vehicle 102 clears the intersection 100.

In some examples, the intersection assistor 128 provides other recommendations that affect the stopping distance and/or the travel time through the intersection 100. In some such examples, the intersection assistor 128 recommends to adjust (e.g., increase or decrease) the speed of the vehicle 102. For example, if at the current speed, the intersection assistor 128 determines that (i) the vehicle 102 cannot stop before the intersection 100 and (ii) the vehicle 102 cannot travel through the intersection before the traffic signal 110 changes to red, the intersection assistor 128 may recommend decreasing the speed of the vehicle 102.

In some examples, based on the received safety message, the intersection assistor 128 tracks the speed and location of one or more vehicles (e.g., the vehicle 104) behind the vehicle 102. In such examples, the intersection assistor 128 calculates an estimate stopping distance of the vehicle 104 behind the vehicle 102. In some such examples, the intersection assistor 128 may alter its recommendation based on a determination that if the vehicle 102 stops before the intersection 100, the following vehicle 104 will not be able to stop before colliding with the vehicle 102. In such an example, the intersection assistor 128 recommends that vehicle 102 proceed through the intersection 100 and signals to the traffic signal 110 to hold the cross-traffic with a red light while the vehicle proceeds through the intersection 100.

Figure 2:
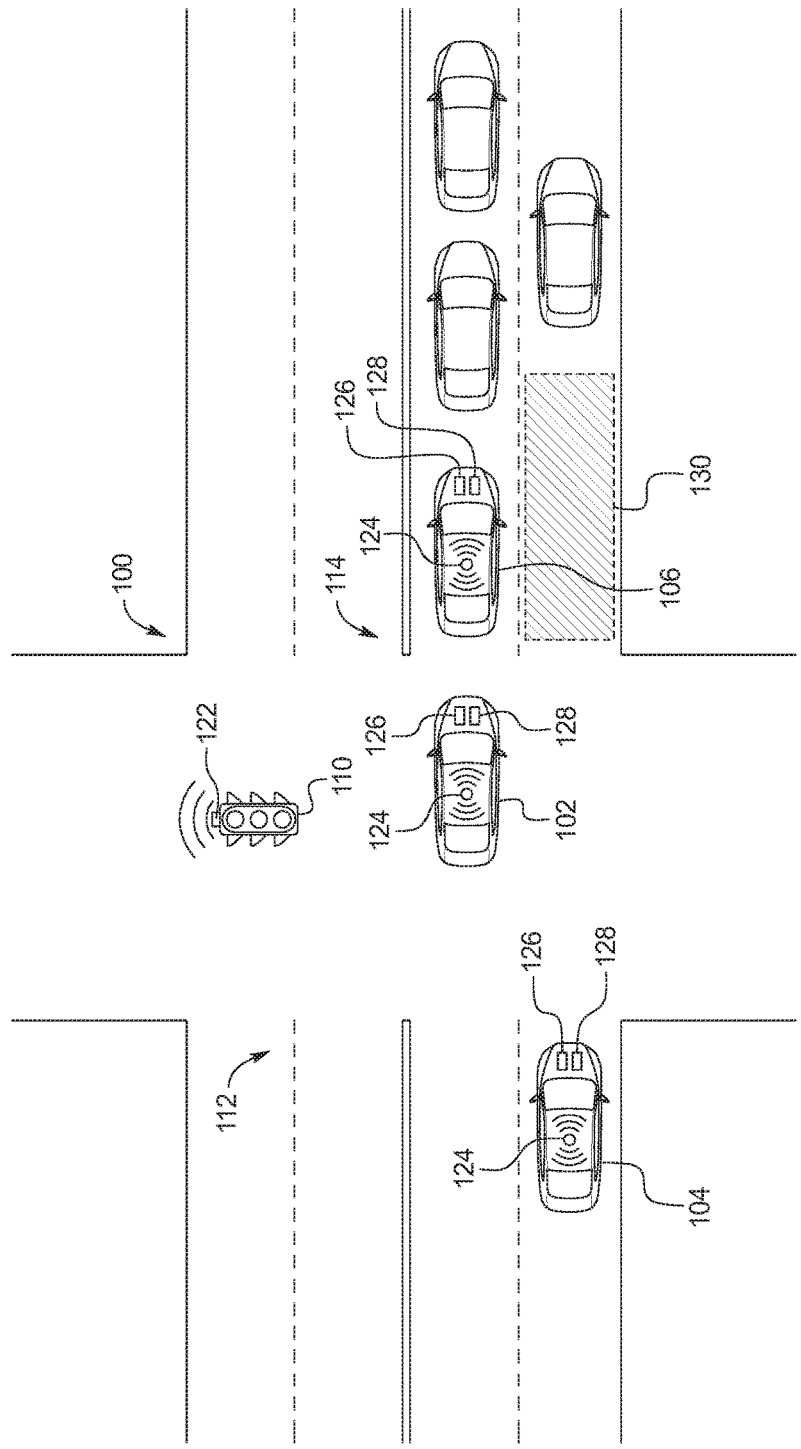
FIG. 2 illustrates another example intersection with vehicles and infrastructure to facilitate intersection assistance using dedicated short range communications.

FIG. 2 illustrates another example intersection 100 with vehicles 102, 104, 106, and 108 and the traffic signal 110 to facilitate intersection assistance using DSRC. In the illustrated example, the crossing vehicle 102 is in the intersection 100. In some examples, the intersection assistor 128 tracks a detailed location of the crossing vehicle 102 based on a global positioning system (GPS) receiver (e.g., the GPS receiver 318 of FIG. 3 below), range detection sensors (e.g., ultrasonic sensors, RADAR, LiDAR, etc.), and/or navigation data (such as Advanced Driver Assistance Systems (ADAS) navigation data). When the intersection assistor 128 detects that the crossing vehicle 102 is stopped in the intersection 100, the intersection assistor 128 determines if there is a space 130 on the far side 114 of the intersection 100. In some examples, the crossing vehicle 102 may not be able to change lanes in order move into the space 130. For example, the size or the acceleration ability of the vehicle 102 may prevent the vehicle from moving into the space 130. In some such examples, the intersection assistor 128, via the DSRC transceiver 124, requests that a vehicle 106 in the same lane that is in front of the crossing vehicle 102 move into the space 130. Additionally, in some examples, the intersection assistor 128, via the DSRC transceiver 124, requests that a vehicle 104 in the same lane as the space 130 on the near side 112 of the intersection 100 stop before entering the intersection to allow the vehicle 106 to move into the space 130.

Figure 3:
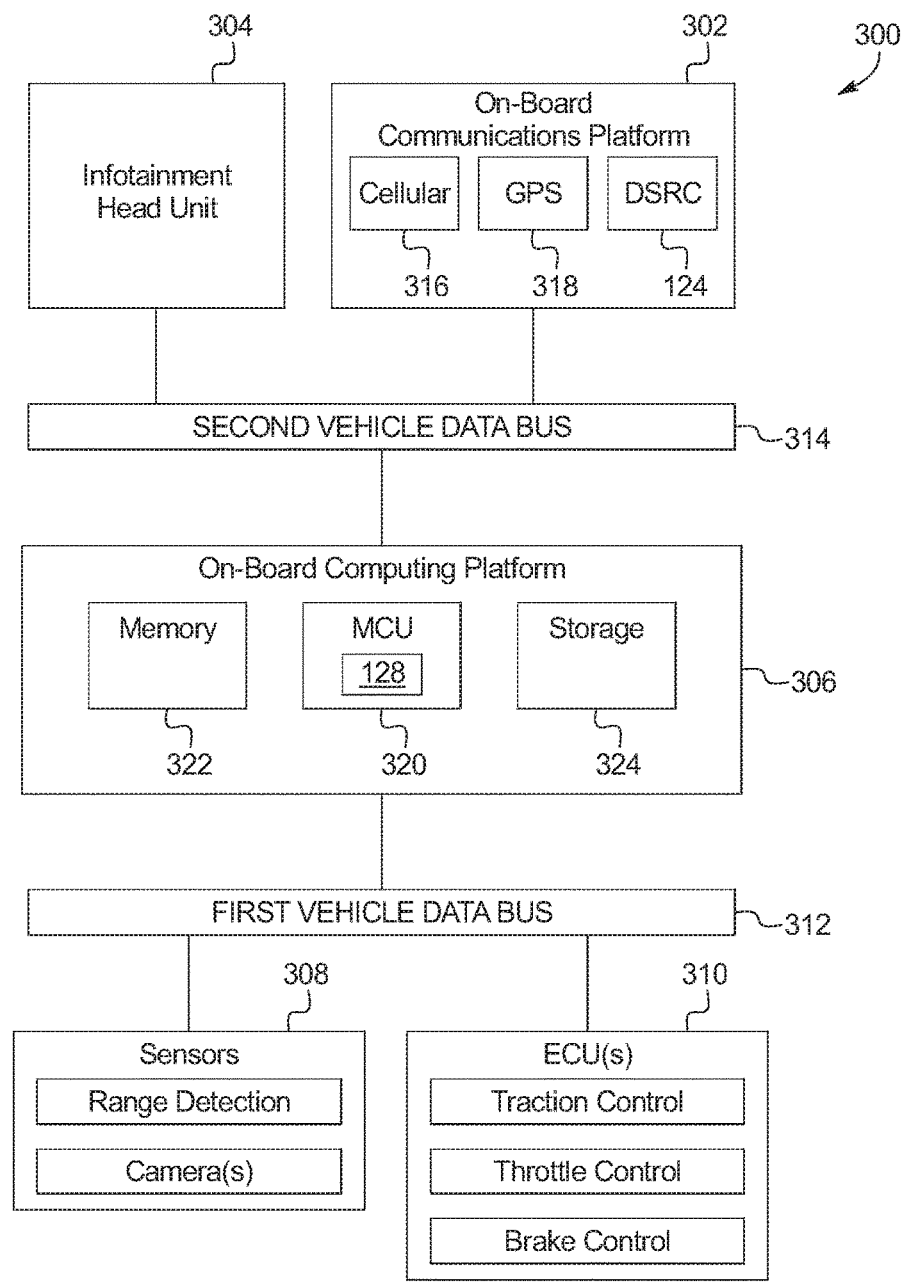
FIG. 3 is a block diagram of electronic components of the vehicles of FIG. 1.

FIG. 3 is a block diagram of electronic components 300 of the vehicles of FIG. 1. The electronic components 300 include an example on-board communications platform 302, the example infotainment head unit 304, an on-board computing platform 306, example sensors 308, example electronic control units (ECUs) 310, a first vehicle data bus 312, and second vehicle data bus 314.

The on-board communications platform 302 includes wired or wireless network interfaces to enable communication with external networks. The on-board communications platform 302 also includes hardware (e.g., processors, memory, storage, antenna, etc.) and software to control the wired or wireless network interfaces. In the illustrated example, the on-board communications platform 302 includes a cellular modem 316, a GPS receiver 318, and the DSRC transceiver 124. The cellular modem 316 includes controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); and Wireless Gigabit (IEEE 802.11ad), etc.). The on-board communications platform 302 may also include one or more controllers for wireless local area networks such as a Wi-FI® controller (including IEEE 802.11 a/b/g/n/ac or others), a Bluetooth® controller (based on the Bluetooth® Core Specification maintained by the Bluetooth Special Interest Group), and/or a ZigBee® controller (IEEE 802.15.4), and/or a Near Field Communication (NFC) controller, etc. Further, the external network(s) may be a public network, such as the Internet; a private network, such as an intranet; or combinations thereof, and may utilize a variety of networking protocols now available or later developed including, but not limited to, TCP/IP-based networking protocols. The on-board communications platform 302 may also include a wired or wireless interface to enable direct communication with an electronic device (such as, a smart phone, a tablet computer, a laptop, etc.).

The example DSRC modules 124 include antenna(s), radio(s) and software to broadcast messages and to establish direct connections between vehicles 104, 106, and 108 and the traffic signal 110. DSRC is a wireless communication protocol or system, mainly meant for transportation, operating in a 5.9 GHz spectrum band. More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA%20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. The term DSRC will be used throughout herein. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The infotainment head unit 304 provides an interface between the vehicle 102 and users (e.g., drivers, passengers, etc.). The infotainment head unit 304 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a dashboard panel, a heads-up display, a center console display (e.g., a liquid crystal display ("LCD"), an organic light emitting diode ("OLED") display, a flat panel display, a solid state display, or a heads-up display), and/or speakers. The infotainment head unit 304 displays and/or otherwise communicates the recommendations from the intersection assistor 128. In some examples, the recommendations are visually presented to the driver via the center console display, the dashboard display, and/or a heads up display. For example, when the intersection assistor 128 recommends proceeding through the intersection, the color of the dashboard display may change to green, and when the intersection assistor 128 recommends not proceeding through the intersection, the color of the dashboard display may change to red. Alternatively or additionally, in some examples, the recommendations from the intersection assistor 128 are audibly presented to the user via the speakers.

The on-board computing platform 306 includes a processor or controller 320, memory 322, and storage 324. In some examples, the on-board computing platform 306 is structured to include the intersection assistor 128. Alternatively, in some examples, the intersection assistor 128 may be incorporated into an ECU 310 with its own processor and memory. The processor or controller 320 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 322 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. In some examples, the memory 322 includes multiple kinds of memory, particularly volatile memory and non-volatile memory. The storage 324 may include any high-capacity storage device, such as a hard drive, and/or a solid state drive.

The memory 322 and the storage 324 are a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 322, the computer readable medium, and/or within the processor 320 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 308 may be arranged in and around the vehicle 102 in any suitable fashion. In the illustrated example, the sensors 308 range detection sensors and cameras. The range detection sensors detect the space 130 into which one of the vehicles 102 and 106 may move. Additionally the range detection sensors be used to detect the location of the detailed location of the vehicle 102.

The ECUs 310 monitor and control the systems of the vehicle 102. The ECUs 310 communicate and exchange information via the first vehicle data bus 312. Additionally, the ECUs 310 may communicate properties (such as, status of the ECU 310, sensor readings, control state, error and diagnostic codes, etc.) to and/or receive requests from other ECUs 310. Some vehicles 102 may have seventy or more ECUs 310 located in various locations around the vehicle 102 communicatively coupled by the first vehicle data bus 312. The ECUs 310 are discrete sets of electronics that include their own circuit(s) (such as integrated circuits, microprocessors, memory, storage, etc.) and firmware, sensors, actuators, and/or mounting hardware. In the illustrated example, the ECUs 310 include the traction control, a throttle control, and a brake control. The traction control detects and responds to road conditions that cause the wheels to slip and that affect the stopping distance of the vehicle 102. The throttle control and the brake control may be used to control the speed of the vehicle 102. For example, if the vehicle 102 is autonomous or semi-autonomous, the throttle control and the brake control may respond to the recommendations by the intersection assistor 128 by adjusting the speed of the vehicle 102.

The first vehicle data bus 312 communicatively couples the sensors 308, the ECUs 310, the on-board computing platform 306, and other devices connected to the first vehicle data bus 312. In some examples, the first vehicle data bus 312 is implemented in accordance with the controller area network (CAN) bus protocol as defined by International Standards Organization (ISO) 11898-1. Alternatively, in some examples, the first vehicle data bus 312 may be a Media Oriented Systems Transport (MOST) bus, or a CAN flexible data (CAN-FD) bus (ISO 11898-7). The second vehicle data bus 314 communicatively couples the on-board communications platform 302, the infotainment head unit 304, and the on-board computing platform 306. The second vehicle data bus 314 may be a MOST bus, a CAN-FD bus, or an Ethernet bus. In some examples, the on-board computing platform 306 communicatively isolates the first vehicle data bus 312 and the second vehicle data bus 314 (e.g., via firewalls, message brokers, etc.). Alternatively, in some examples, the first vehicle data bus 312 and the second vehicle data bus 314 are the same data bus.

Figure 4:
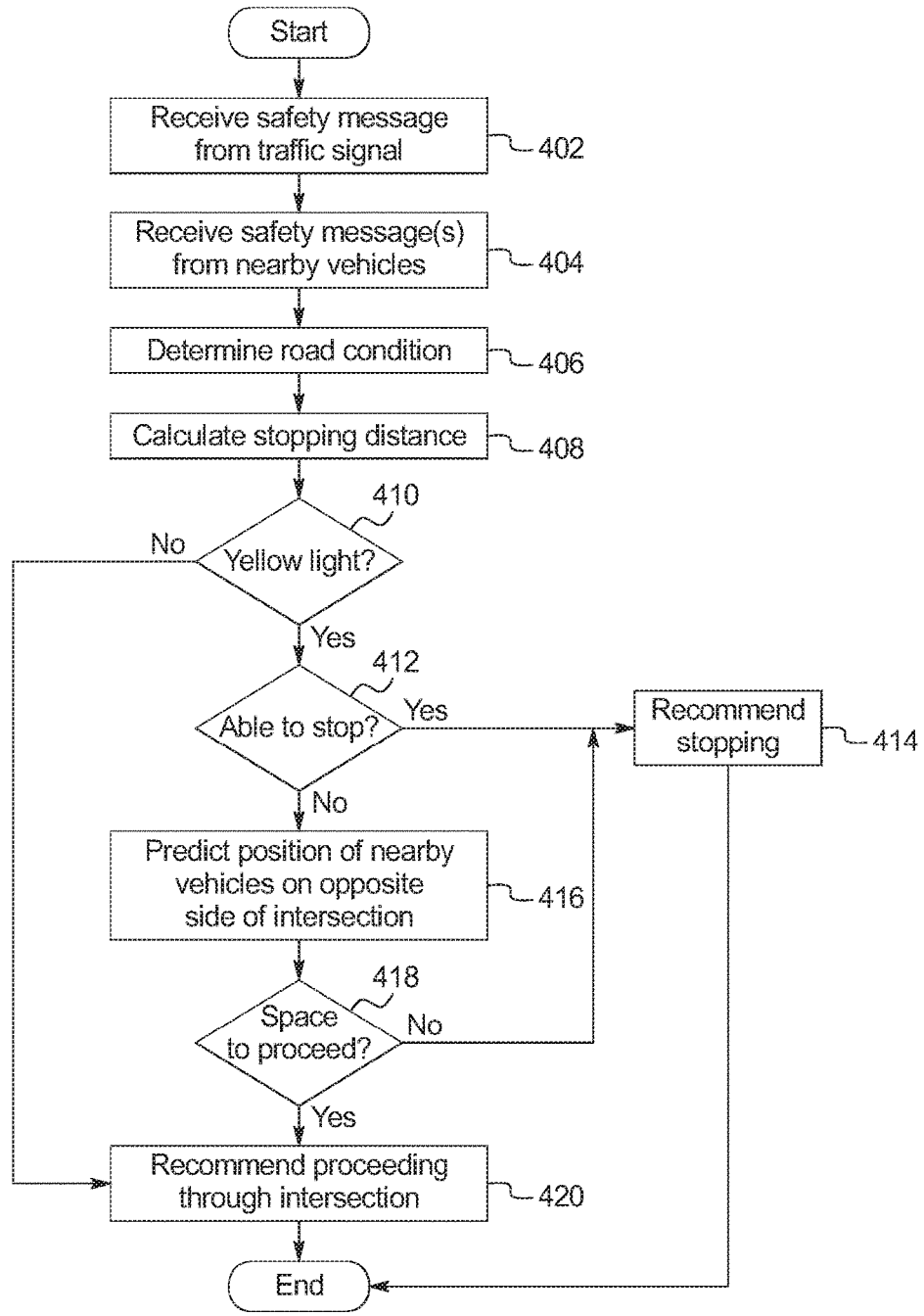
FIG. 4 is a flowchart depicting an example method to assist a vehicle at the intersection of FIG. 1 that may be implemented by the electronic components of FIG. 3.

FIG. 4 is a flowchart depicting an example method to assist the vehicle 102 at the intersection 100 of FIG. 1 that may be implemented by the electronic components 300 of FIG. 3. Initially, when the vehicle 102 is moving towards an intersection 100, the intersection assistor 128, via the DSRC transceiver 124, receives a safety message from one or more traffic signals 110 in range (block 402). The safety messages include the status and timing of the lights of the corresponding traffic signal 110, the location of the corresponding traffic signal 110, and the length(s) of the intersection 100. The intersection assistor 128, via the DSRC transceiver 124, receives safety messages broadcast from nearby vehicles 104, 106 and 108 within range of the vehicle 102 (block 404). The safety messages include the location of the corresponding nearby vehicle 104, 106 and 108, the heading of the corresponding nearby vehicle 104, 106 and 108, the speed of the corresponding nearby vehicle 104, 106 and 108, and/or the size of the corresponding nearby vehicle 104, 106 and 108.

The intersection assistor 128 determines the condition (e.g., wet, icy, snowy, etc.) of the road (block 406). In some examples, the intersection assistor 128 determines the condition of the road via the traction control. For example, if the traction control engages the brakes to compensate for one or more wheels moving at a different speed, then the intersection assistor 128 may infer that the road is slippery. Based on the speed of the vehicle 102, the weight of the vehicle 102 and the condition of the road, the intersection assistor 128 calculates the stopping distance of the vehicle 102 (block 408).

Based on the SPaT message(s) received from the traffic signal 110 at block 402, the intersection assistor 128 determines whether the traffic light corresponding to the heading of the vehicle 102 is going to change to yellow before or during the vehicle would be in the intersection 100 (Block 410). If the traffic light is not going to change to yellow, the intersection assistor 128 recommends proceeding through the intersection 100 (block 420). Otherwise, if the traffic light is going to change to yellow, based on the stopping distance calculated at block 408, the intersection assistor 128 determines whether the vehicle 102 is able to stop before the intersection 100 (block 412). If the vehicle is able to stop, the intersection assistor 128 recommends stopping (block 414).

Otherwise, if the intersection assistor 128 determines the vehicle 102 is not able to stop before the intersection 100, the intersection assistor 128 projects the position(s) of vehicle(s) 106 and 108 on the far side 114 of the intersection 100 (block 416). The projected position(s) is/are based on the heading, speed, and size information in the safety message(s) from the vehicle(s) 106 and 108 received at block 404. The intersection assistor 128 determines whether there will be space on the far side 114 of the intersection 100 for the vehicle 102 to clear the intersection 100 before the corresponding traffic signal changes to red (block 418). If intersection assistor 128 determines there will be space on the far side 114 of the intersection 100, the intersection assistor 128 recommends proceeding through the intersection 100 (block 420). Otherwise, if the intersection assistor 128 determines there will not be space on the far side 114 of the intersection 100, the intersection assistor 128 recommends not proceeding through the intersection 100 (block 414). In some examples, when the intersection assistor 128 determines the vehicle 102 is not able to stop before the intersection 100 and the intersection assistor 128 determines there will not be space on the far side 114 of the intersection 100, the intersection assistor 128 broadcasts a safety message requesting the traffic signal 110 to hold the cross traffic light red.

Figure 5:
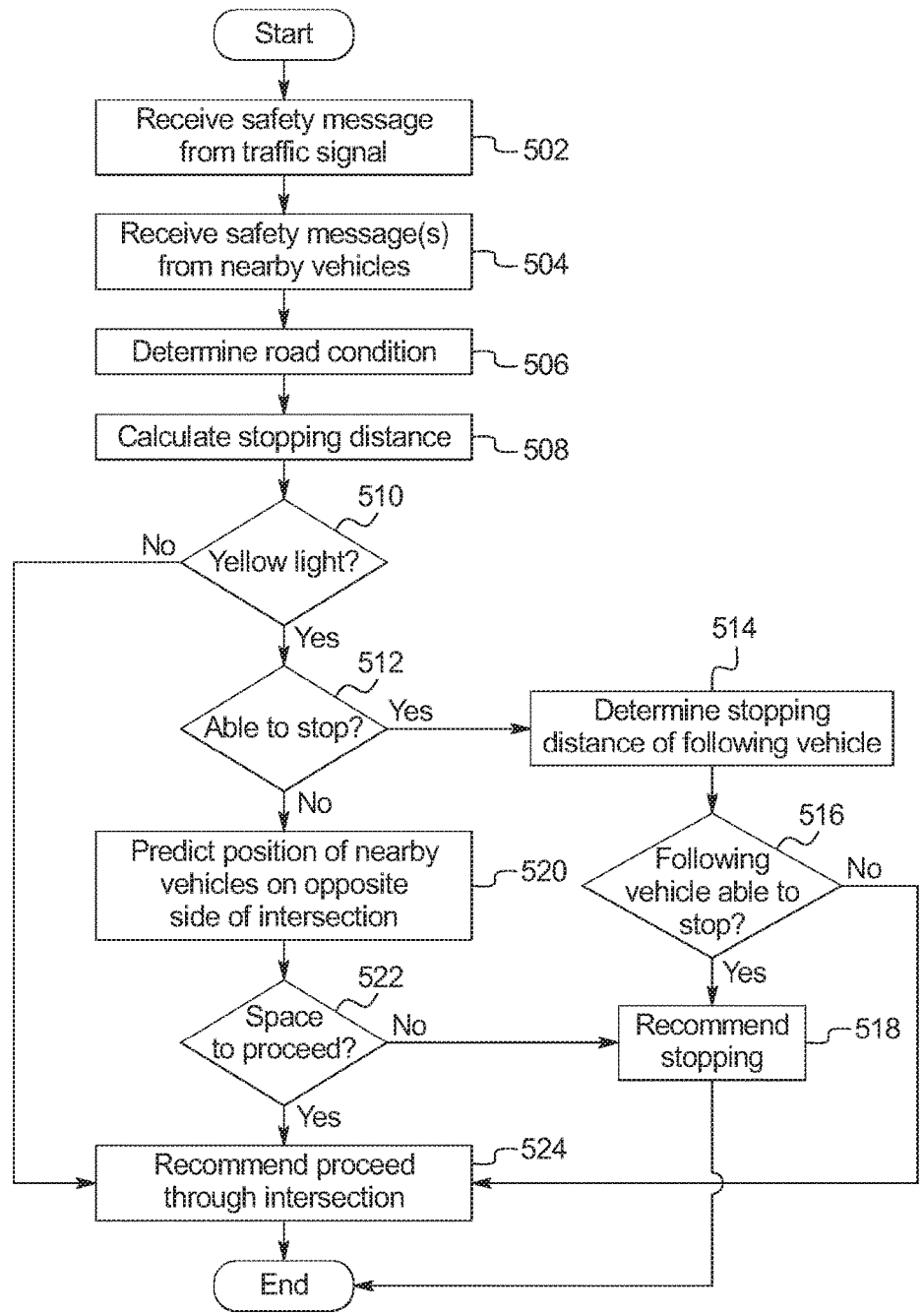
FIG. 5 is another flowchart depicting an example method to assist a vehicle at the intersection of FIG. 1 that may be implemented by the electronic components of FIG. 3.

FIG. 5 is another flowchart depicting an example method to assist the vehicle 102 at the intersection 100 of FIG. 1 that may be implemented by the electronic components of FIG. 3. Initially, when the vehicle 102 is moving towards an intersection 100, the intersection assistor 128, via the DSRC transceiver 124, receives SPaT message(s) from one or more traffic signals 110 in range (block 502). The safety messages include the status and timing of the lights of the corresponding traffic signal 110, the location of the corresponding traffic signal 110, and the length(s) of the intersection 100. The intersection assistor 128, via the DSRC transceiver 124, receives safety messages broadcast from nearby vehicles 104, 106 and 108 within range of the vehicle 102 (block 504). The safety messages include the location of the corresponding nearby vehicle 104, 106 and 108, the heading of the corresponding nearby vehicle 104, 106 and 108, the speed of the corresponding nearby vehicle 104, 106 and 108, and/or the size of the corresponding nearby vehicle 104, 106 and 108.

The intersection assistor 128 determines the condition (e.g., wet, icy, snowy, etc.) of the road (block 506). In some examples, the intersection assistor 128 determines the condition of the road via the traction control. For example, if the traction control engages the brakes to compensate for one or more wheels moving at a different speed, then the intersection assistor 128 may infer that the road is slippery. Based on the speed of the vehicle 102, the weight of the vehicle 102 and the condition of the road, the intersection assistor 128 calculates the stopping distance of the vehicle 102 (block 508).

Based on the SPaT message(s) received from the traffic signal 110 at block 402, the intersection assistor 128 determines whether the traffic light corresponding to the heading of the vehicle 102 is going to change to yellow before or during the vehicle would be in the intersection 100 (Block 510). If the traffic light is not going to change to yellow, the intersection assistor 128 recommends proceeding through the intersection 100 (block 524). Otherwise, if the traffic light is going to change to yellow, based on the stopping distance calculated at block 408, the intersection assistor 128 determines whether the vehicle 102 is able to stop before the intersection 100 (block 512). If the vehicle is able to stop, the intersection assistor 128 determines the stopping distance of one or more following vehicles 104 (block 514). The intersection assistor 128 determines if the following vehicle 104 is able to stop so as to not collide with the vehicle 102 if the vehicle 102 stops (block 516). If the following vehicle 104 is able to stop, the intersection assistor 128 recommends stopping (block 518). Otherwise, if the following vehicle 104 is not able to stop, the intersection assistor 128 recommends proceeding through the intersection 100 (block 524). The intersection assistor 128 also broadcasts a safety message requesting the traffic signal 110 to hold the cross traffic light red.

Otherwise, if the intersection assistor 128 determines the vehicle 102 is not able to stop before the intersection 100, the intersection assistor 128 projects the position(s) of vehicle(s) 106 and 108 on the far side 114 of the intersection 100 (block 520). The projected position(s) is/are based on the heading, speed, and size information in the safety message(s) from the vehicle(s) 106 and 108 received at block 404. The intersection assistor 128 determines whether there will be space on the far side 114 of the intersection 100 for the vehicle 102 to clear the intersection 100 before the corresponding traffic signal changes to red (block 522). If intersection assistor 128 determines there will be space on the far side 114 of the intersection 100, the intersection assistor 128 recommends proceeding through the intersection 100 (block 524). Otherwise, if the intersection assistor 128 determines there will not be space on the far side 114 of the intersection 100, the intersection assistor 128 determines the stopping distance of one or more following vehicles 104 (block 514). The intersection assistor 128 determines if the following vehicle 104 is able to stop so as to not collide with the vehicle 102 if the vehicle 102 stops (block 516). If the following vehicle 104 is able to stop, the intersection assistor 128 recommends stopping (block 518). Otherwise, if the following vehicle 104 is not able to stop, the intersection assistor 128 recommends proceeding through the intersection 100 (block 524). The intersection assistor 128 also broadcasts a safety message requesting the traffic signal 110 to hold the cross traffic light red.

Figure 6:
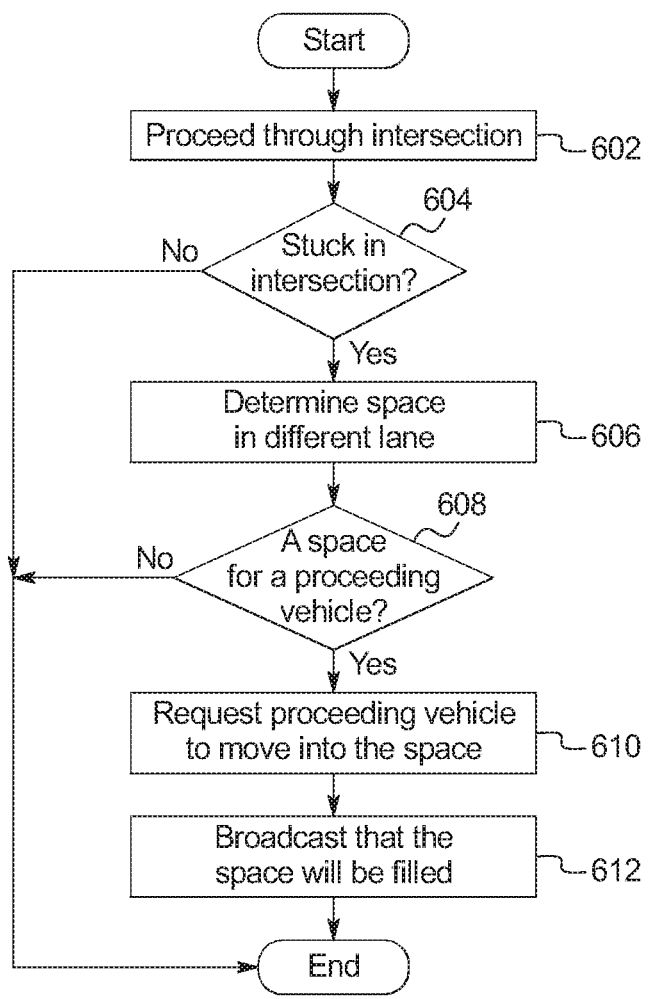
FIG. 6 is a flowchart depicting an example method to assist a vehicle at the intersection of FIG. 2 that may be implemented by the electronic components of FIG. 3.

FIG. 6 is a flowchart depicting an example method to assist a vehicle 102 at the intersection 100 of FIG. 2 that may be implemented by the electronic components 300 of FIG. 3. Initially, the vehicle 102 proceeds through the intersection 100 (block 602). For example, the vehicle 102 may proceed through the intersection 100 based on the recommendation from the intersection assistor 128 at block 524 above. The intersection assistor 128 determines whether the vehicle 102 is stuck in the intersection 100 (block 604). In some examples, the intersection assistor 128 determines that the vehicle 102 is stuck in the intersection 100 based on detailed location information and the speed of the vehicle 102. If the vehicle 102 is stuck in the intersection 100, the intersection assistor 128 determines if a space 130 exists on the far side 114 of the intersection 100 in the lands dedicated to the direction of travel that is the same as the heading of the vehicle 102 (block 606). In some examples, the determination is based on the location data in safety messages broadcast by the nearby vehicles 104, 106, and 108, range detection sensors on the vehicle 102, and/or detailed location information from navigation data (e.g., ADAS data) (block 608). If the intersection assistor 128 determines that the space 130 exists, the intersection assistor 128, via the DSRC transceiver 124, requests that one of the vehicles 106 in the same lane as the vehicle 102 move into the space 130 (block 610). Additionally, the intersection assistor 128, via the DSRC transceiver 124, broadcasts a message informing vehicles 104 on the near side 112 that the space 130 will be filled (block 612).

The flowcharts of FIGS. 4, 5, and 7 are representative of machine readable instructions that comprise one or more programs that, when executed by a processor (such as the processor 320 of FIG. 3), cause the vehicle 102 to implement the intersection assistor 128 of FIGS. 1 and 2. Further, although the example program(s) is/are described with reference to the flowcharts illustrated in FIGS. 4, 5, and 7, many other methods of implementing the example intersection assistor 128 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A host vehicle comprising:
   a dedicated short range communication transceiver that receives safety messages from a stationary transceiver and a first vehicle at a far side of an intersection; and
   a processor that, before the host vehicle reaches the intersection:
      defines a first zone between a second and third zone before the intersection, sizes of the zones based on a speed of the vehicle; and
      when the host vehicle is in the first zone:
         based on the received safety messages, predicts whether the first vehicle will render a space available for the host vehicle when the host vehicle clears the intersection and before a traffic light facing the host vehicle turns red; and
         determines a recommendation on whether to traverse the intersection based on the prediction; and
   a display device that displays the recommendation.

2. The host vehicle of claim 1, wherein one or more of the safety messages received from the first vehicle includes a speed value for the first vehicle, a heading of the first vehicle, and a location of the first vehicle.

3. The host vehicle of claim 1, wherein the processor determines a stopping distance of the host vehicle.

4. The host vehicle of claim 3, wherein the recommendation on whether to traverse the intersection is additionally based on the stopping distance of the host vehicle.

5. The host vehicle of claim 1, wherein one or more of the safety messages received from the stationary transceiver includes timing of traffic lights controlled by a traffic signal.

6. The host vehicle of claim 5, wherein the recommendation on whether to traverse the intersection is based on a time between one of the traffic lights changing from a green light to a red light, the one of the traffic lights corresponding to a heading of the host vehicle.

7. A method comprising:
receiving, via a dedicated short range communication transceiver of a host vehicle, safety messages from a stationary transceiver and a first vehicle at a far side of an intersection and within a range of a host vehicle; and
before the host vehicle reaches the intersection:
defining, with a processor of the host vehicle, a first zone between a second and third zone before the intersection, sizes of the zones based on a speed of the host vehicle;
when the host vehicle enters the first zone;
based on the received safety messages, predicting, with the processor of the host vehicle, whether the first vehicle will render a space available for the host vehicle when the host vehicle clears the intersection and before a traffic light facing the host vehicle turns red;
determining, with the processor of the host vehicle, a recommendation on whether to traverse the intersection based on the prediction; and
displaying, on a display device, the recommendation.

8. The method of claim 7, wherein one or more of the safety messages received from the first vehicle includes a speed value for the corresponding vehicle, a heading of the corresponding vehicle, and a location of the corresponding vehicle.

9. The method of claim 7, including determining a stopping distance of the host vehicle.

10. The method of claim 9, wherein the recommendation on whether to traverse the intersection is also based on the stopping distance of the host vehicle.

11. The method of claim 7, wherein one or more of the safety messages received from the stationary transceiver includes timing of traffic lights controlled by the traffic signal.

12. The method of claim 11, wherein the recommendation on whether to traverse the intersection is based on a time between one of the traffic lights changing from a green light to a red light, the one of the traffic lights corresponding to a heading of the host vehicle.

13. A vehicle comprising:
processors to:
before the vehicle reaches an intersection:
receive messages from a stationary transceiver and another vehicle at the intersection far side;
based on the received messages, predict whether the another vehicle will render a space available for the vehicle when the vehicle clears the intersection and before a traffic light facing the vehicle turns red; and
a display device to display a recommendation to traverse the intersection based on the prediction.

14. The host vehicle of claim 1, wherein the sizes of the zones are also based on a condition of a road at the intersection.

15. The method of claim 7, further comprising:
determining, with the processor of the host vehicle, a stopping distance of a second vehicle behind the host vehicle and a trajectory of the first vehicle; and
responsive to (a) the stopping distance indicating that the second vehicle will collide with the host vehicle if the host vehicle stops and (b) the trajectory indicating that there will not be room for the host vehicle on the far side of the intersection, (i) determining that the recommendation includes proceeding through the intersection, and (ii) sending a request to the first vehicle to alter its trajectory to provide space for the host vehicle.

* * * * *